(12) United States Patent
Hanley et al.

(10) Patent No.: US 6,611,408 B2
(45) Date of Patent: Aug. 26, 2003

(54) ELECTRICAL TRANSFORMER

(75) Inventors: Peter Hanley, Gloucestershire (GB); Ian Leitch McDougall, Oxon (GB)

(73) Assignee: Oxford Instruments PLC, Oxford (GB)

( * ) Notice: Subject to any disclaimer, the term of this patent is extended or adjusted under 35 U.S.C. 154(b) by 0 days.

(21) Appl. No.: 09/935,157

(22) Filed: Aug. 23, 2001

(65) Prior Publication Data

US 2002/0017974 A1 Feb. 14, 2002

Related U.S. Application Data

(62) Division of application No. 09/379,607, filed on Aug. 24, 1999, now Pat. No. 6,300,856.

(30) Foreign Application Priority Data

Sep. 1, 1998 (GB) ............................................. 9819058

(51) Int. Cl.[7] ................................................. H02H 7/00
(52) U.S. Cl. ...................... 361/58; 361/19; 336/DIG. 1; 335/216
(58) Field of Search ................................. 361/11, 19, 58, 361/93.1, 93.6, 93.9, 141; 336/DIG. 1; 335/216, 297, 299

(56) References Cited

U.S. PATENT DOCUMENTS

| 3,703,664 A | 11/1972 | Cronin | 361/19 |
|---|---|---|---|
| 3,987,339 A | 10/1976 | Wroblewski | 315/278 |
| 4,045,823 A | 8/1977 | Parton | 361/58 |
| 4,336,561 A | 6/1982 | Murphy | 361/19 |
| 5,063,472 A | 11/1991 | Van Doan et al. | 361/19 |
| 5,241,447 A | 8/1993 | Barber et al. | 361/141 |
| 5,475,560 A | 12/1995 | Onishi et al. | 361/141 |
| 5,546,261 A | 8/1996 | Yoshida et al. | 361/19 |
| 5,617,280 A | 4/1997 | Hara et al. | 361/19 |
| 5,930,095 A | 7/1999 | Joo et al. | 361/58 |

FOREIGN PATENT DOCUMENTS

| DE | 1638516 | 8/1971 | ........... H01F/27/34 |
|---|---|---|---|
| EP | 0273171 | 7/1998 | ........... H01F/36/00 |
| FR | 268666 | 7/1993 | ........... H02H/9/02 |
| GB | 2 321 137 A | * 7/1998 | ........... H01F/27/34 |

* cited by examiner

Primary Examiner—Ronald W. Leja

(57) ABSTRACT

The present invention relates to an electrical transformer which includes a primary winding coupled to first and second magnetic circuits. A magnetic flux is driven through the magnetic circuits by the primary winding. First and second secondary windings are also provided, each associated with a respective one of the magnetic circuits and being electrically connected together in series opposition. A closed superconducting fault current winding is also provided to link with the magnetic flux in the second magnetic circuit.

3 Claims, 2 Drawing Sheets

ELECTRICAL TRANSFORMER

CROSS-REFERENCE TO RELATED APPLICATIONS

This application is a Divisional of application Ser. No. 09/379,607, filed Aug. 24, 1999, now U.S. Pat. No. 6,300,856.

BACKGROUND OF THE INVENTION

1. Field of the Invention

The invention relates to electrical transformers, for example for use in the power distribution industry.

2. Description of the Prior Art

Electrical transformers are used in a variety of applications to step down (or step up) a voltage supply to a load. When large voltages are involved, problems can arise when a fault develops in the load resulting in a sudden demand for power. Typically, this is dealt with by including circuit breakers and the like but these are expensive and not always reliable.

SUMMARY OF THE INVENTION

In accordance with the present invention, an electrical transformer comprises a primary winding; first and second magnetic circuits magnetically coupled with the primary winding and through which magnetic flux is driven by the primary winding; first and second secondary windings each associated with a respective one of the magnetic circuits and electrically connected together in series opposition; and a short-circuited superconducting winding, hereinafter known as the "fault current winding" linked by the magnetic flux in the second magnetic circuit.

We have developed a transformer which incorporates automatic fault current limiting by making use of a closed or short circuited superconducting winding. In use, the secondary windings will be connected to a load and under normal conditions, when the load impedance is high enough not to draw excessive current, the superconducting fault current winding has current induced in it which opposes the magnetic flux linkage in the second magnetic circuit. The second secondary winding therefore has no electromotive force induced in it, and the output of the transformer is determined by the properties of the primary winding and the first secondary winding only.

In the event of a fault, such as a reduction in load impedance, or a short circuit in the output circuit, the current in the fault current winding will rise. When it exceeds the superconducting critical current, the shorted winding becomes resistive, and if the resistance is great enough, the induced electromotive force is not sufficient to drive a current through the fault current winding which opposes all the flux linkage. This allows an electromotive force to be induced in the second secondary winding, which opposes that of the first secondary winding. This effect therefore reduces the output voltage of the transformer so as to limit the current which can be drawn from it.

The use of a superconducting fault current winding to achieve fault-current limitation is desirable because the mechanism is fail-safe, very fast, has no moving parts and is self-sensing. Also, at larger ratings, this approach becomes much more commercially viable in comparison with conventional circuit breakers.

Although the transformer could be constructed from resistive windings, preferably the primary and secondary windings are superconductive.

In the case of transformers, there is a potential saving in eliminating the ohmic loss in the windings, provided that the refrigeration cost can be made small enough. Also, superconducting transformers could be more compact because of the higher current density in the windings and the elimination of coolant circulation and heat-exchange hardware.

By making all the windings superconducting, the transformer principle allows properties of the superconductor to be matched to the application so that the superconducting material can be used in a form which can be readily manufactured and is robust.

Most conveniently, the primary, secondary and fault current windings are housed in a common cryostat. This significantly reduces the refrigeration overhead compared with independent systems.

It is possible to utilize a single turn for the fault current winding although a coil having more than one turn could also be used.

Typically, the reluctances of the two magnetic circuits will be similar, so that the current in the fault current winding is proportional to the current in the primary winding, which is in turn determined by the load impedance.

The transformer can be conveniently designed with identical cross-sections and lengths of iron (or other magnetic material such as ferrite) in the two magnetic circuits. However, under normal conditions, the first (not coupled to the fault current winding) will carry more flux than the second, so that the iron will be operating over a different part of its B/H curve, so that the reluctance will be slightly different. So long as the iron is not saturated, this difference should not affect the operation of the device.

BRIEF DESCRIPTION OF THE DRAWINGS

An example of an electrical transformer according to the invention will now be described with reference to the accompanying drawings, in which.

DETAILED DESCRIPTION OF THE EMBODIMENT

Figure 1:
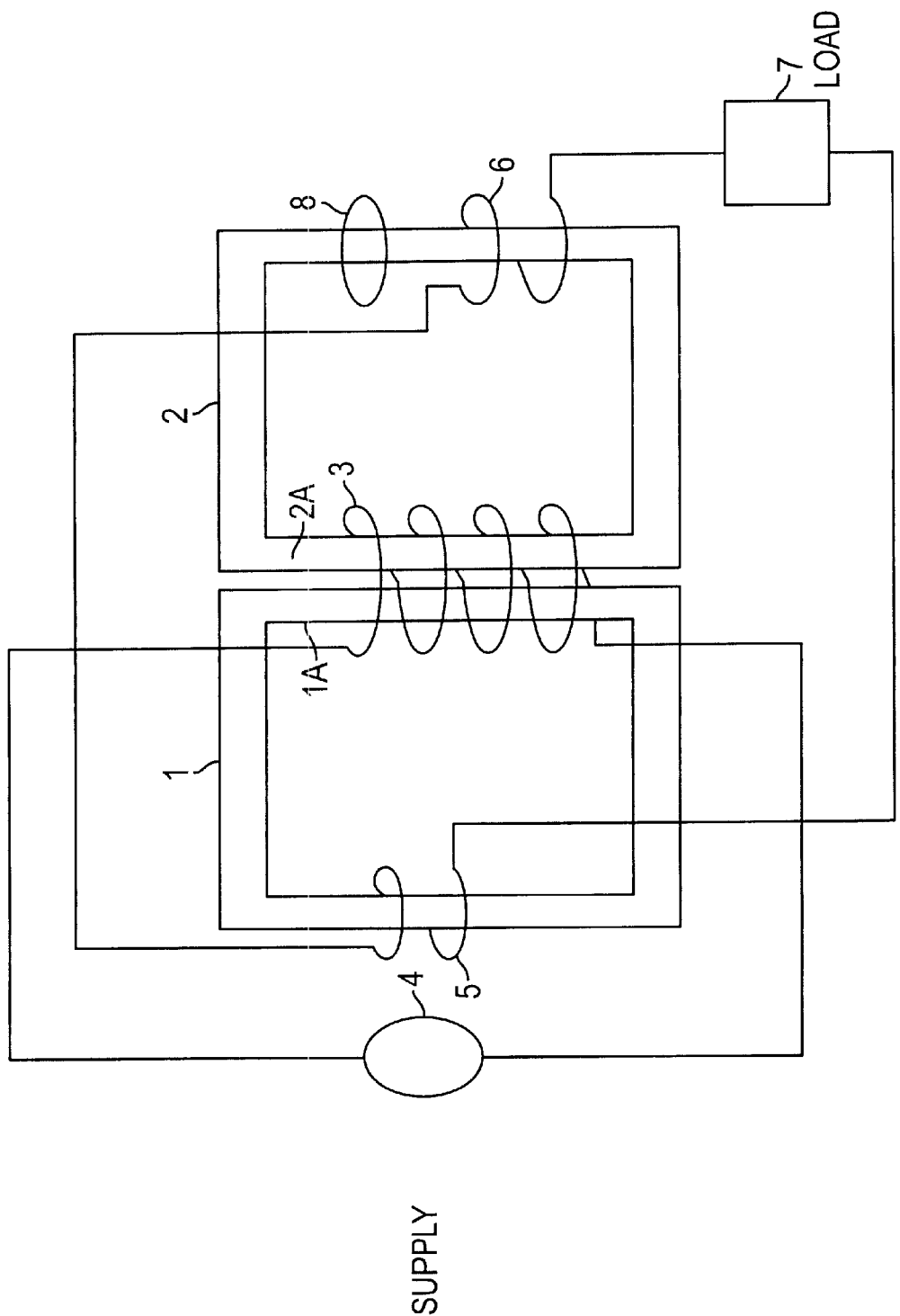
FIG. 1 is a circuit diagram of the transformer connected to a supply and a load.

The transformer shown in FIG. 1 comprises a pair of rectangular, iron yokes 1,2 defining respective first and second magnetic circuits and lying alongside one another. Adjacent arms 1A,2A of the magnetic circuits 1,2 pass through a primary winding 3 of the transformer which is connected to a supply 4.

First and second secondary windings 5,6 are provided around the magnetic circuits 1,2 respectively and are connected in series opposition to each other and to a load 7.

As mentioned above, although the windings 3,5,6 could be resistive, preferably they are superconductive and will be mounted in a suitable cryostat. A shorted turn 8 of superconductor is provided around an arm of the magnetic circuit 2.

As described above, under normal conditions, when the load impedance is high enough not to draw excessive current, the shorted turn 8 has a current induced in it which opposes the magnetic flux linkage in the magnetic circuit 2. The second secondary winding 6 therefore has no electromotive force induced in it and the output of the transformer is determined by the properties of the primary winding 3 and the first secondary winding 5.

When a fault such as a reduction in load impedance occurs, the current in the shorted turn 8 will rise. When it exceeds the superconducting critical current, the shorted turn 8 will become resistive, and if the resistance is great enough, the induced electromotive force is not sufficient to drive a current through the turn 8 which opposes all the flux linkage. This allows an electromotive force to be induced in the second secondary winding 6 which opposes that of the first secondary winding 5. This effect then reduces the output voltage of the transformer so as to limit the current which can be drawn from it.

The following summarizes a mathematical analysis of the system which has been carried out using the DERIVE program published by Soft Warehouse Inc., of Honolulu, Hawaii, USA.

The circuit equations for a system of inductively coupled circuits can be described by the vector equation:

$$\bar{V} = (j\omega \bar{M} + \bar{R}) \bar{I} \qquad (1)$$

where

M is the mutual inductance matrix, and

R is a diagonal matrix containing the resistances of each circuit.

In the circuit shown in FIG. 1:

$$V = [V_{supply}, 0, 0]$$

$$I = [I_{prim}, I_{sec}, I_{short}]$$

$$M = \begin{vmatrix} L_p & M_{p,s1} - M_{p,s2} & M_{p,s3} \\ M_{p,s1} - M_{p,s2} & L_{s1} + L_{s2} & M_{s2,s3} \\ M_{p,s3} & M_{s2,s3} & L_{s3} \end{vmatrix}$$

$$R = \begin{vmatrix} R_{supply} & 0 & 0 \\ 0 & R_{load} & 0 \\ 0 & 0 & R_{short} \end{vmatrix}$$

Where the subscripts have the following meanings:

p,prim refer to the primary coil, sec refers to the series current in the secondary coils, s1 refers to the secondary winding 5, s2 refers to the secondary winding 6, s3 refers to the shorted, superconducting coil 8, L is inductance, and M is mutual inductance.

Note that there is no coupling between winding 5 and winding 6, or between winding 5 and turn 8, because they are on difference magnetic circuits.

The inductances can be described in terms of the number of turns, $n_p$, $n_s$ ($n_s$ is the number of turns in one of the secondary windings, 5,6, the secondary windings 5 and 6 having equal turns in this analysis) and the core dimensions given by:

$$K = \mu \mu_0 \frac{A}{l}$$

where:

A is the cross-sectional area of the magnetic circuit, and l is the length of the flux path around the magnetic circuit.

$M_{p,s1} = n_p n_s k K$ etc where leakage is allowed for in the coupling constant k, $L_p = n_p^2 k 2K$ $L_{s1} = n_{s1}^2 K$ etc.

It is also convenient to work in terms of $$\text{Turns ratio } a = \frac{n_p}{n_s}$$

$$\text{Second turns ratio } a_2 = \frac{n_s}{n_3}$$

where:

$n_3$ is the number of turns in the shorted turn 8.

Ratio of actual to nominal load impedance $$\delta = \frac{R_{load}}{\text{nominal\_load}}$$

Ratio of secondary coil impedance to nominal load $$\beta = \frac{\omega(L_{s1} + L_{s2})}{\text{nominal\_load}}$$

Equation 1 can then be solved for the currents in each circuit. The expressions which are obtained are extremely large, but capable of being used. In order to present the results in a more comprehensible form, some simplifying assumptions may be made.

The supply has a negligible output impedance, $R_{supply} = 0$;

There is no flux leakage, k=1.

The results can then be tabulated (Table 1) for the two conditions:

"Normal"-$R_{short}$=0 (superconductive)

"Fault"-$R_{load}$=0, $R_{short}$ non-zero (resistive).

TABLE 1

| | Normal | Fault |
|---|---|---|
| $I_{prim}$ | $\sqrt{1 + 4\frac{\delta^2}{\beta^2}} \frac{V_{supply}}{a^2 \delta \text{ nominal\_load}}$ | $\sqrt{1 + \left(\frac{4\alpha_2 R_{short}}{\beta \text{ nominal\_load}}\right)^2} \frac{V_{supply}}{a^2 \alpha_2^2 R_{short}}$ |
| $I_{sec}$ | $\frac{V_{supply}}{a \delta \text{ nominal\_load}}$ | $\frac{V_{supply}}{4 \alpha \alpha_2^2 R_{short}}$ |
| $I_{short}$ | $2\sqrt{1 + \left(\frac{\delta}{\beta}\right)^2} \frac{\alpha_2 V_{supply}}{a \delta \text{ nominal\_load}}$ | $\frac{V_{supply}}{2 a \alpha_2 R_{short}}$ |

It is also possible to model this system using SPICE. SPICE is a well known program for modeling electronic circuits, originally developed by the University of California at Berkeley, and available in a number of implementations. This enables the non-linearity of the magnetic circuits to be included, and the validity of the simplifications mentioned above to be investigated. However, the SPICE algorithm imposes some limitations, and in particular does not allow a circuit to contain zero resistance. In the following, the superconductor was modeled by a resistance of $10^{-6}$ ohm and the short circuit by 0.001 ohm.

Figure 2:
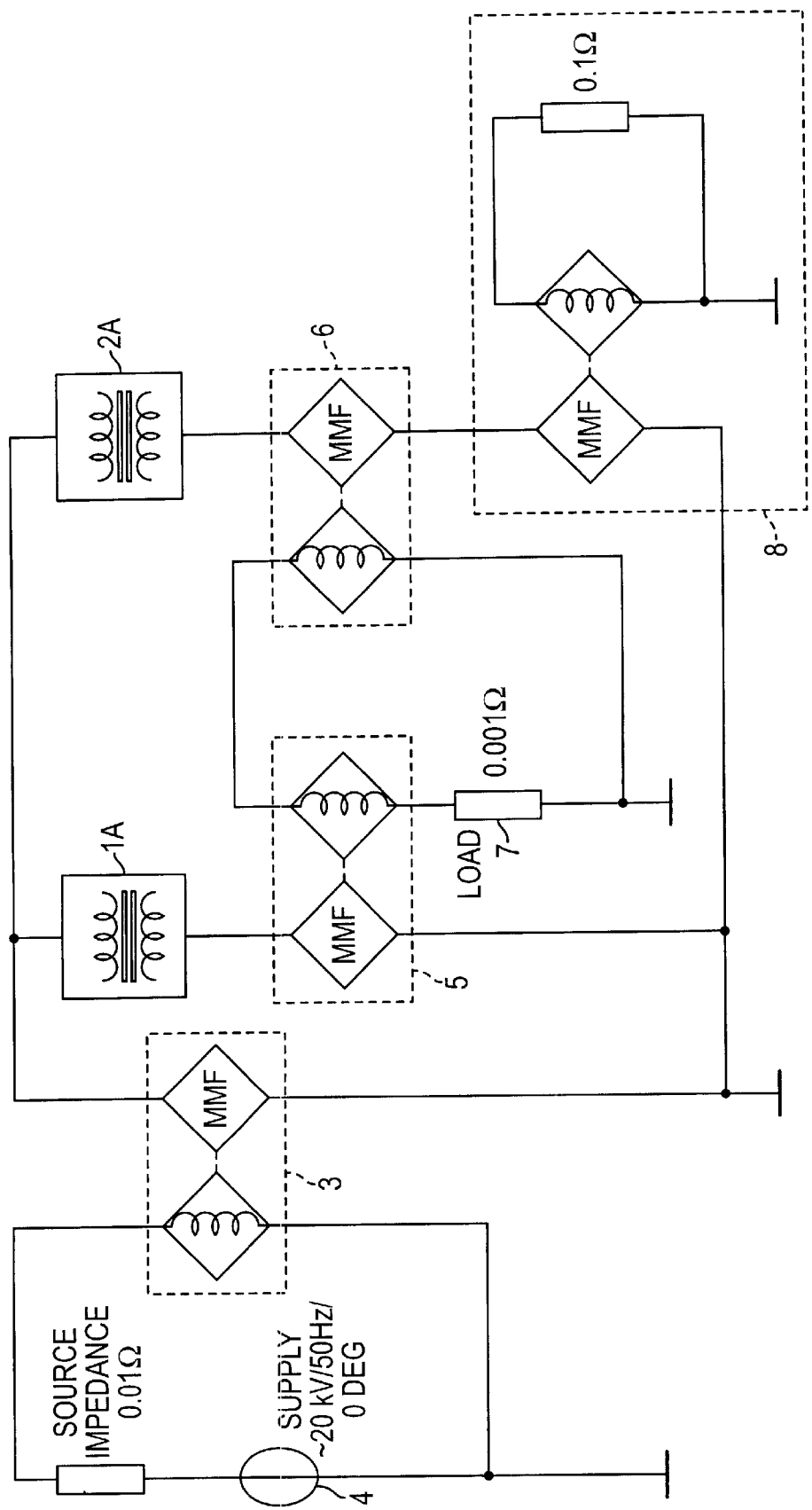
FIG. 2 is a schematic circuit diagram used for performing the SPICE model to be described.

The following values were used in the above analytical expressions and also in a SPICE model, whose circuit schematic is shown in FIG. 2.

In this model, it is assumed that:

| | | | |
|---|---|---|---|
| A = 0.047 m² | I = 0.72 m | $n_3 = 1$ | |
| $n_s$ = 18 | $n_p$ = 1800 | | |
| $V_{supply}$ = 20 kV | nominal load = 4 ohms | | |

For the expressions $\mu$=1802, and in the SPICE model the following BH curve was used:

| B tesla | H A/m |
|---|---|
| 0.00 | 0.0 |
| 0.60 | 191 |
| 1.20 | 530 |
| 1.43 | 889 |
| 1.51 | 1206 |
| 1.57 | 1694 |
| 1.63 | 2414 |
| 1.73 | 4283 |
| 1.80 | 6012 |
| 1.85 | 7772 |
| 1.90 | 9788 |
| 1.95 | 12229 |
| 2.00 | 14989 |
| 2.08 | 20010 |
| 2.20 | 27806 |

The results of these two calculations are compared in Table 2 below for different values of $R_{short}$.

TABLE 2

| | $R_{short}$ ohms | Normal Expressions | Normal SPICE | Fault Expressions | Fault SPICE |
|---|---|---|---|---|---|
| $I_{prim}$ | 0.001 | 0.517 | 0.509 | 6.173 | 1.543 |
| | 0.01 | | | 0.686 | 0.161 |
| | 0.1 | | | 0.065 | 0.050 |
| $I_{sec}$ | 0.001 | 50.00 | 49.98 | 154.3 | 154.3 |
| | 0.01 | | | 17.15 | 15.40 |
| | 0.1 | | | 1.591 | 1.540 |
| $I_{short}$ | 0.001 | 1816 | 1806 | 5556 | 5551 |
| | 0.01 | | | 617.3 | 555.0 |
| | 0.1 | | | 57.27 | 55.8 |

Agreement is good, except at very low values of $R_{short}$.

In the example which has been used, good limiting has been obtained for a normal-state resistance of 0.01 ohms. For the given core size, a resistivity of $10^{-6}$ ohm-metres and a critical current of 2000 A, this requires a critical current density of $2.5 \times 10^7$ A/m², which is relatively undemanding.

The above example has used equal numbers of turns on the two secondary windings 5,6. However it is possible to use different numbers of turns, and thereby accommodate the properties of the superconductor (the relationship between critical current and resistance) to the requirements of the current limiter.

Table 3 below plots the fault currents against $R_{short}$ for different numbers of turns on the second secondary winding.

TABLE 3

| | $R_{short}$ ohms | 9 turns | 18 turns | 36 turns |
|---|---|---|---|---|
| $I_{prim}$ | 0.001 | 2.74 | 1.54 | 0.688 |
| | 0.005 | 0.551 | 0.388 | 0.147 |

TABLE 3-continued

| | $R_{short}$ ohms | 9 turns | 18 turns | 36 turns |
|---|---|---|---|---|
| | 0.01 | 0.280 | 0.161 | 0.087 |
| | 0.05 | 0.077 | 0.057 | 0.055 |
| | 0.1 | 0.060 | 0.051 | 0.054 |
| $I_{sec}$ | 0.001 | 274 | 154 | 68.76 |
| | 0.005 | 54.9 | 30.9 | 13.8 |
| | 0.01 | 27.5 | 15.4 | 6.94 |
| | 0.05 | 5.9 | 3.08 | 1.74 |
| | 0.1 | 3.5 | 1.54 | 1.27 |
| $I_{short}$ | 0.001 | 7397 | 5551 | 3702 |
| | 0.005 | 1481 | 1111 | 741 |
| | 0.01 | 741 | 555 | 370 |
| | 0.05 | 148 | 111 | 74.1 |
| | 0.1 | 74.1 | 55.6 | 37.0 |

If, for example, we wished to limit the secondary current to 15 A under fault conditions, this could be achieved with the following values of $R_{short}$, for different numbers of turns (Table 4). The corresponding value of the rated current in the shorted turn, under normal conditions, is also shown. Choosing the critical current to be 25% greater than this, the critical current density ($J_c$) of the superconductor 8 can then be calculated.

TABLE 4

| | 9 turns | 18 turns | 36 turns |
|---|---|---|---|
| $R_{short}$ for fault $I_{sec}$ = 15 A, Ω | 0.02 | 0.01 | 0.0045 |
| $I_{short}$, rated normal, A | 1361 | 1806 | 2704 |
| Superconductor section mm² | 41.5 | 83 | 184 |
| Power for fault kW | 2.74 | 3.09 | 3.05 |
| Power density kW/m³ | 79600 | 45000 | 19900 |
| Current density ($J_c$) Amm⁻² | 41 | 27 | 18 |

In this analysis, we have assumed that the superconducting shorted turn 8 is a cylinder. The inner radius is fixed by the size of the magnetic core plus an allowance for insulation etc. (the core diameter is in turn determined by the power rating of the transformer). We also assume that the resistivity of the, superconductor has a value of $10^{-6}$ ohm-metre. A given resistance around this turn then defines the cross-sectional area required.

What is claimed is:

1. A method of controlling fault current in a transformer, comprising:

inducing current in a first winding through a first magnetic circuit magnetically coupled to a primary winding; and inducing current in a second winding, in series opposition to the current generated in the first winding, through a second magnetic circuit magnetically coupled to the primary winding, where the second magnetic circuit includes a closed circuit fault current winding, wherein the current in the second winding is increased, when current induced in the fault current winding exceeds a critical current.

2. The method of controlling fault current of claim 1, further comprising:

generating an output current based on the current in the first and second windings and the fault current winding.

3. The method of controlling fault current of claim 1, wherein the fault current winding is a superconductor.

\* \* \* \* \*